(12) United States Patent
Cho et al.

(10) Patent No.: US 6,619,801 B2
(45) Date of Patent: Sep. 16, 2003

(54) PROJECTION TYPE IMAGE DISPLAY APPARATUS REALIZING THREE-DIMENSIONAL IMAGE

(75) Inventors: Kun-ho Cho, Suwon-si (KR); Chul-woo Lee, Seongnam-si (KR); Dae-sik Kim, Suwon-si (KR); Seung-tae Jung, Seongnam-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/933,278

(22) Filed: Aug. 21, 2001

(65) Prior Publication Data

US 2002/0034015 A1 Mar. 21, 2002

(30) Foreign Application Priority Data

Sep. 21, 2000 (KR) ........................................ 2000-55479

(51) Int. Cl.⁷ ........................ G03B 21/14; G03B 21/26; G03B 21/00; G02B 5/32; H04N 9/083
(52) U.S. Cl. ............................. 353/20; 353/30; 353/34; 353/37; 353/38; 353/48; 353/81; 353/82; 353/122; 359/20; 359/228; 348/291; 349/7
(58) Field of Search ................................ 353/20, 3, 30, 353/34, 37, 82, 122, 38, 46, 81; 359/1, 15, 20, 228, 665, 666, 832; 348/291; 361/298.1; 349/5, 7

(56) References Cited

U.S. PATENT DOCUMENTS

| | | | | |
|---|---|---|---|---|
| 5,574,580 A | * | 11/1996 | Ansley | 349/5 |
| 5,760,850 A | * | 6/1998 | Nakanishi et al. | 349/5 |
| 6,070,982 A | * | 6/2000 | Aritake | 353/20 |
| 6,347,014 B1 | * | 2/2002 | Hayashi et al. | 359/634 |
| 6,457,828 B1 | * | 10/2002 | Hayashi | 353/20 |

* cited by examiner

Primary Examiner—Russell Adams
Assistant Examiner—Magda Cruz
(74) Attorney, Agent, or Firm—Staas & Halsey LLP

(57) ABSTRACT

A projection type image display apparatus includes a light source emitting light, a polarization device transmitting light polarized in one direction of incident light emitted from the light source, a reflection type image generating unit generating a color image from incident light and reflecting the generated color image to proceed along a path different from a path of the incident light, a light deflection device deflecting the image reflected by the image generating unit, and a projection lens unit magnifying and transmitting the image generated by the image generating unit and deflected by the light deflection device to proceed toward a screen. Thus, a full color can be realized with respect to the area of a pixel, and an efficiency in use of light and resolving power can be improved.

41 Claims, 13 Drawing Sheets

PROJECTION TYPE IMAGE DISPLAY APPARATUS REALIZING THREE-DIMENSIONAL IMAGE

CROSS REFERENCE TO RELATED APPLICATION

This application claims the benefit of Korean Patent Application No. 00-55479, filed Sep. 21, 2000, in the Korean Industrial Property Office, the disclosure of which is incorporated herein by reference.

BACKGROUND OF THE INVENTION

1. Field of the Invention

The present invention relates to a projection type image display apparatus that forms an image generated by a display device on a screen by using light emitted from a light source, and more particularly, to a projection type image display apparatus which can provide high efficiency in light use and improve resolving power so that a three-dimensional image can be realized.

2. Description of the Related Art

Referring to FIG. 1, a conventional projection type image display apparatus includes a light source 10 emitting light, first and second dichromatic mirrors 42 and 44 for splitting incident white light to red, blue and green light rays, first through third transmission type display devices 51, 53 and 55 for forming an image corresponding to each of the split light rays, a color prism 60 for synthesizing images formed by the respective first through third display devices 51, 53 and 55, a projection lens unit 70 for magnifying and transmitting the synthesized image, and a screen 80.

Here, the projection type image display apparatus further includes a fly-eye lens array 20, arranged on an optical path between the light source 10 and the first dichromatic mirror 42, for mixing incident light rays so that a uniform light ray can be incident on each of the first through third display devices 51, 53 and 55, a polarizer 31 for transmitting light having one polarization component, and a focusing lens 41 for focusing light passing through the polarizer 31.

Since the conventional projection type image display apparatus having the above structure adopts three units of display devices to generate a color image, the optical configuration thereof is complicated. Also, since the light having one polarization component is used as an effective light by using the polarizer and the light passing through the polarizer is split by the first and second dichromatic mirrors to proceed along three paths, an efficiency in light use is lowered.

SUMMARY OF THE INVENTION

Accordingly, it is an object of the present invention to provide a projection type image display apparatus in which brightness of light is improved by using a holographic color filter lens to realize a color image, and resolution power is improved by using a light deflection device so that a three-dimensional image can be realized.

Additional objects and advantages of the invention will be set forth in part in the description which follows, and in part, will be obvious from the description, or may be learned by practice of the invention.

Accordingly, to achieve the above and other objects, there is provided a projection type image display apparatus comprising a light source projecting light, a polarization device transmitting light polarized in one direction of incident light emitted from the light source, a reflection type image generating unit generating a color image from incident light and reflecting the generated color image to proceed along a path different from a path of the incident light, a light deflection device deflecting the image reflected by the image generating unit, and a projection lens unit magnifying and transmitting the image generated by the image generating unit and deflected by the light deflection device to proceed toward a screen.

Also, to achieve the above and other objects, there is provided a projection type image display apparatus comprising a light source projecting light, a polarization device transmitting light polarized in one direction of incident light emitted from the light source, a reflection type image generating unit generating an image from incident light and reflecting the generated image, a polarization beam splitter, provided on an optical path between the polarization device and the image generating unit, changing a proceeding path of incident light according to the polarization direction, a light deflection device deflecting the image reflected by the image generating unit and passing through the polarization beam splitter, and a projection lens unit magnifying and transmitting the image deflected by the light deflection device to proceed toward a screen.

Also, to achieve the above and other objects, there is provided a projection type image display apparatus comprising a light source projecting light, a polarization device transmitting light polarized in one direction of incident light emitted from the light source, a transmission type image generating unit generating a image from incident light and transmitting the generated image, a light deflection device deflecting the image passing through the image generating unit, and a projection lens unit magnifying and transmitting the image deflected by the light deflection device to proceed toward a screen.

Also, to achieve the above and other objects, there is provided a projection type image display apparatus comprising a light source projecting light, a polarization device transmitting light polarized in one direction of the light emitted from the light source, a display device having independently driven pixels generating an image from incident light, a first lens array formed of a plurality of lenses attached to one side of the display device focusing the image generated by the display device, a light deflection device deflecting the image focused by the first lens array, a projection lens unit magnifying and transmitting the image deflected by the light deflection device to proceed toward a screen, and a second lens array formed of a plurality of lenses corresponding to the number of lenses of the first lens array which is attached to at least one side of the screen.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
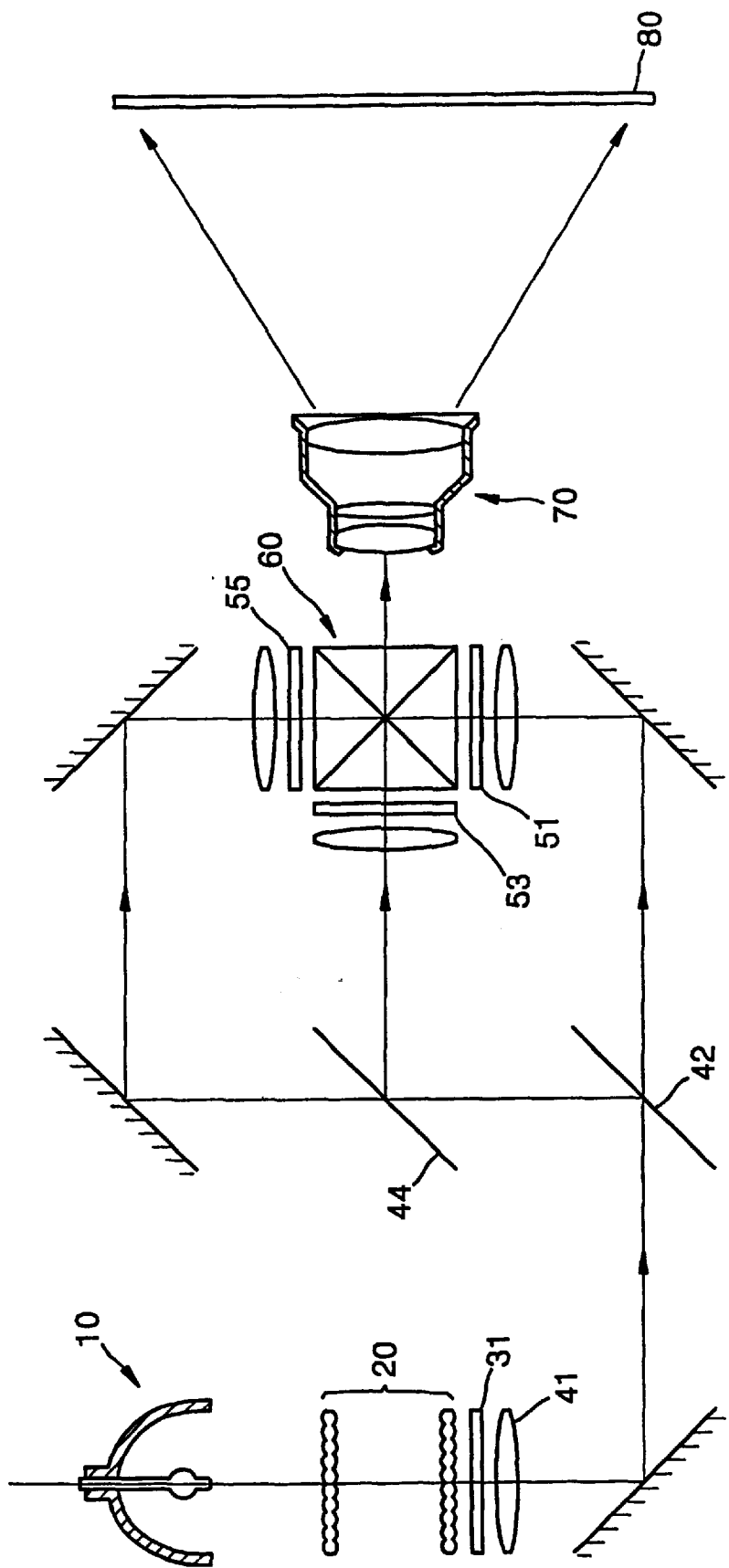
FIG. 1 is a view showing the optical arrangement of the conventional projection type image display apparatus.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
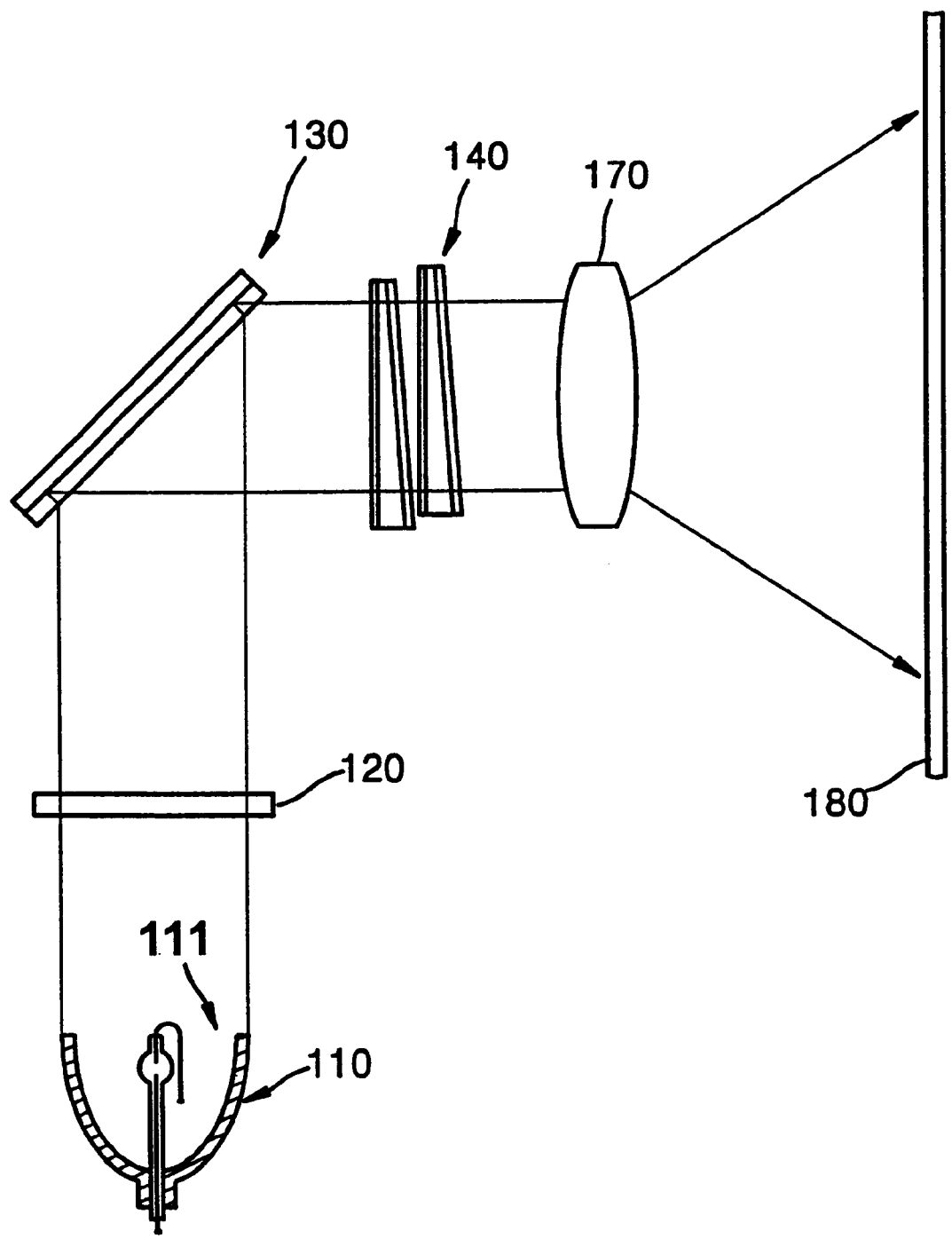
FIG. 2 is a view showing the optical arrangement of a projection type image display apparatus according to an embodiment of the present invention.

Referring to FIG. 2, a projection type image display apparatus according to an embodiment of the present invention includes a light source 110 emitting light in one direction, a polarization device 120, a reflection type image generating unit 130, a light deflection device 140 deflecting the light reflected by the image generating unit 130, and a projection lens unit 170 magnifying and projecting an image reflected by the image generating unit 130 and polarized by the light deflection device 140 toward a screen 180.

The light source 110 includes a lamp such as a xenon or halogen lamp and a reflection mirror 111 provided at one side of the lamp reflecting the light emitted from the lamp to proceed in one direction. The polarization device 120 transmits light polarized in one direction of the non-polarized light output from the light source 110 so that the light polarized in one direction can proceed toward the reflection type image generating unit 130.

Figure 3:
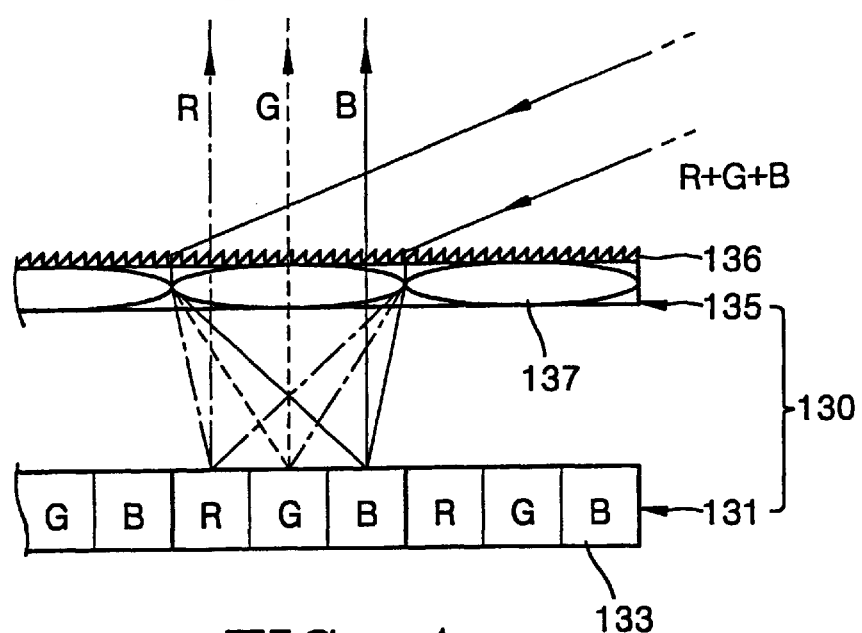
FIG. 3 is a view showing the optical arrangement of the image generating unit shown in FIG. 2.

The reflection type image generating unit 130 generates color images from incident light and reflects the generated color images to proceed along a path different from that of the incident light. Referring to FIG. 3, the reflection type image generating unit 130 includes a color separation unit 135 and a reflection type display device 131 generating an image from each of the separated colors and reflecting the generated image. The color separation unit 135 is formed to face one surface of the display device 131 and splits incident light according to a predetermined wavelength area and make the split light rays travel at different angles. For this purpose, the color separation unit 135 includes a hologram pattern 136 and a lens array 137. The hologram pattern 136 diffracts and transmits white light of one polarization passing through the polarization device 120, that is, (R+G+B) mixed with red (R), green (G) and blue (B), at different angles according to the color thereof. The lens array 137 focuses each color light diffracted while passing through the hologram pattern 136 at each pixel 133 of the display device 131.

An image reflected by each pixel 133 of the display device 131 is incident on the lens array 137 in the state of being divergent. Then, the image is focused by the lens array 137 into a parallel light beam, and linearly passes through the hologram pattern 136 to be incident on the light deflection device 140.

Figure 4:
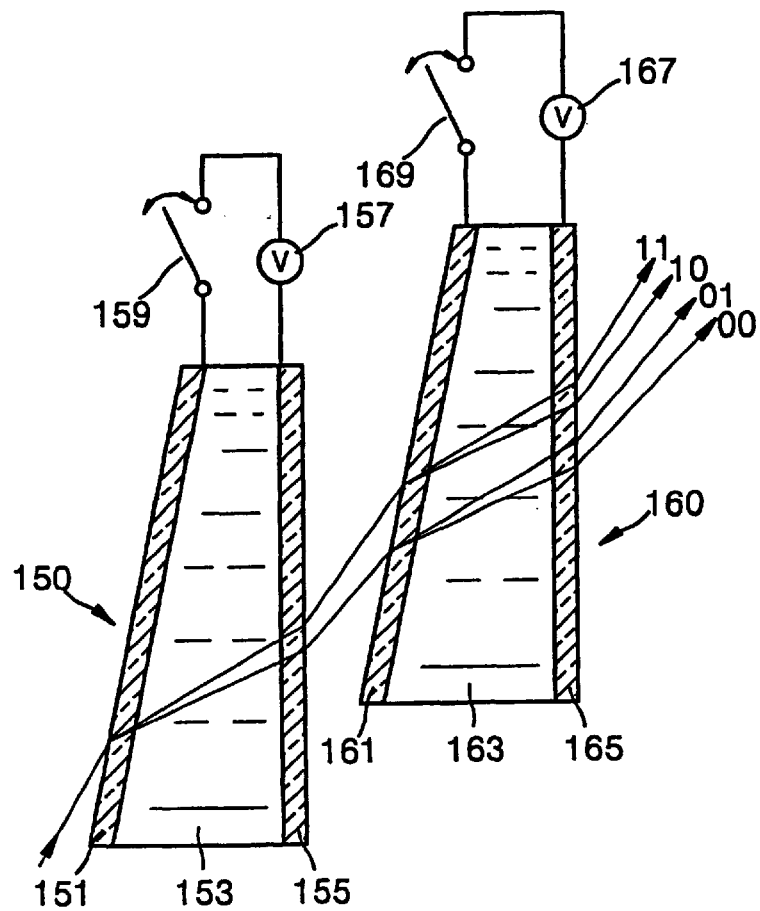
FIG. 4 is a view showing the light deflection device of FIG. 2.

Referring to FIGS. 2 and 4, the light deflection device 140 making each color image generated by the display device 130 focused sequentially in an area of a pixel of the screen 180 includes first and second light deflection devices 150 and 160.

The first light defection device 150 primarily deflects and transmits light reflected by the display device 130, which includes a pair of first and second transparent electrodes plates 151 and 155 arranged to be separated a predetermined distance from each other and to transmit incident light, a first liquid crystal 153 disposed between the first and second transparent electrode plates 151 and 155, and a first power source selectively applying a voltage to the first and second transparent electrode plates 151 and 155. The first power source includes a first voltage source 157 and a first switch 159. Thus, when the first switch 159 maintains an ON state, the voltage supplied by the first voltage source 157 is applied to each of the first and second transparent electrode plates 151 and 155, so that the direction that the first liquid crystal 153 is oriented changes to a different direction from the direction when the first switch 159 is in an OFF state. Thus, the light incident on the first transparent electrode plate 151 at an angle passes through the second transparent electrode plate 155 at different angles according to the application of the power source.

The second light deflection device 160 deflecting again the light passing through the first light deflection device 150, includes a pair of third and fourth transparent electrode plates 161 and 165 arranged to be separated a predetermined distance from each other to transmit incident light, a second liquid crystal 163 provided between the third and fourth transparent electrode plates 161 and 165, and a second power source selectively applying a voltage to the third and fourth transparent electrode plates 161 and 165. The second power source includes a second voltage source 167 and a second switch 169. Thus, when the second switch 169 maintains an ON state, the voltage supplied from the second voltage source 167 is applied to each of the third and fourth transparent electrode plates 161 and 165 to change the direction that the second liquid crystal 163 is oriented, different from the direction of orientation when the second switch 169 is in an OFF state. Thus, the light incident on the third transparent electrode plate 161 at an angle passes through the fourth transparent electrode plate 165 at different angles according to the application of the power source.

Thus, when the first and second light deflection devices 150 and 160 are adopted as light deflection devices, the proceeding path of incident light can be divided into four optical paths, that is, "00", "01", "10" and "11", according to the state at which it is driven. Accordingly, an image of each color formed by the display device 131 can be formed in order in an area of one pixel of the screen 180. This operation is described with reference to FIGS. 4, 5 and 6A through 6C.

Figure 5:
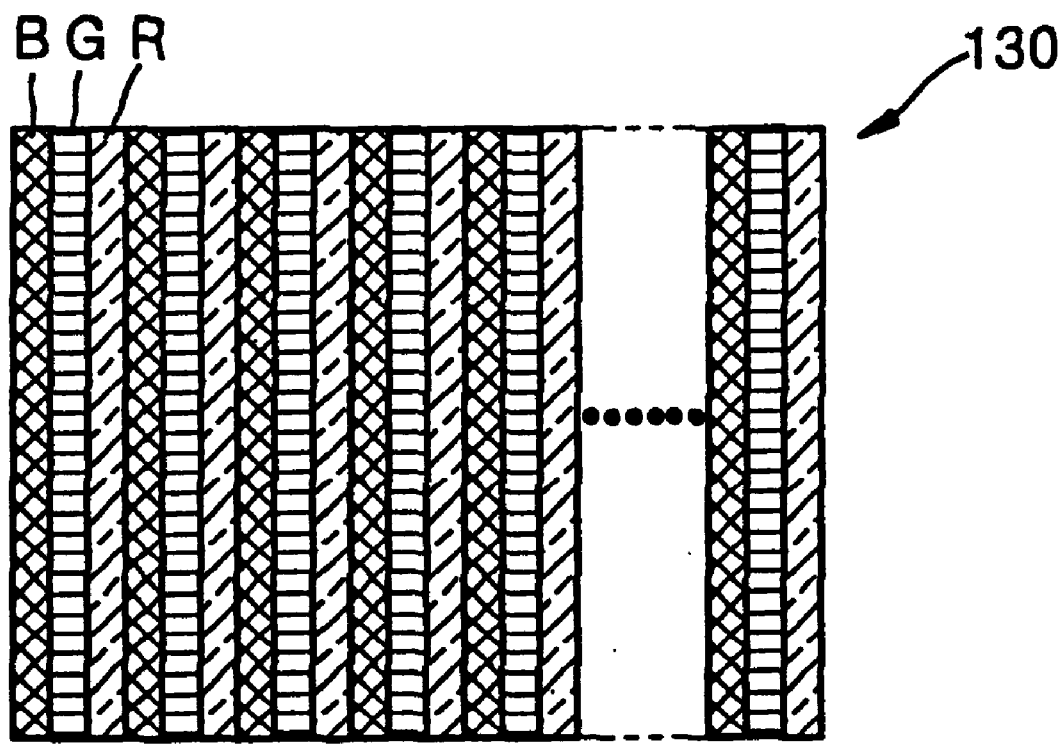
FIG. 5 is a view showing a pattern for each color of the image generated by the image generating unit of FIG. 2.

FIG. 5 shows a pattern for each color of the image generated by the image generating unit 130 of FIG. 2. Images of the respective colors separated by the color separation unit (135 of FIG. 2) are sequentially generated.

Figure 6A:
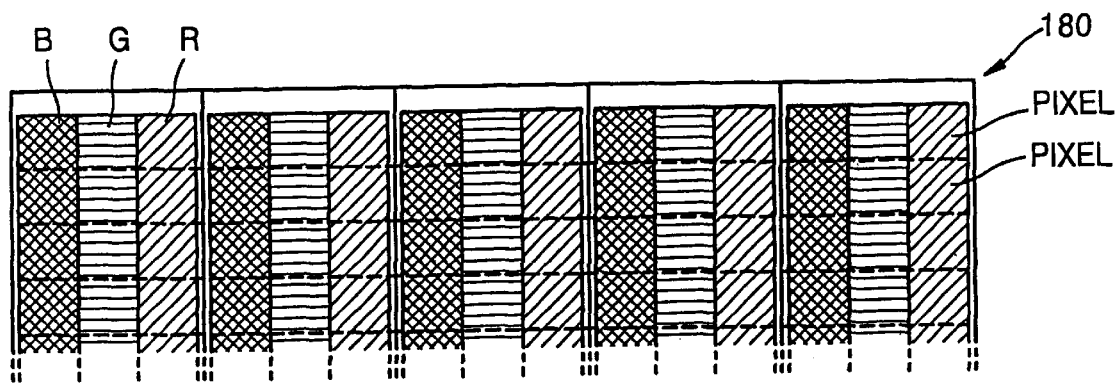
FIGS. 6A, 6B and 6C are views respectively showing displaced positions of a color image formed on a screen according to driving of a light deflection device.
Figure 6B:
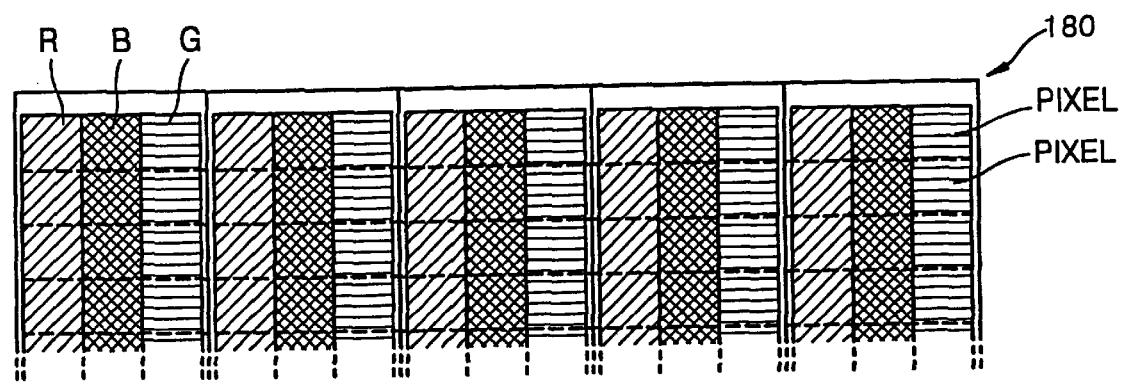
Figure 6C:
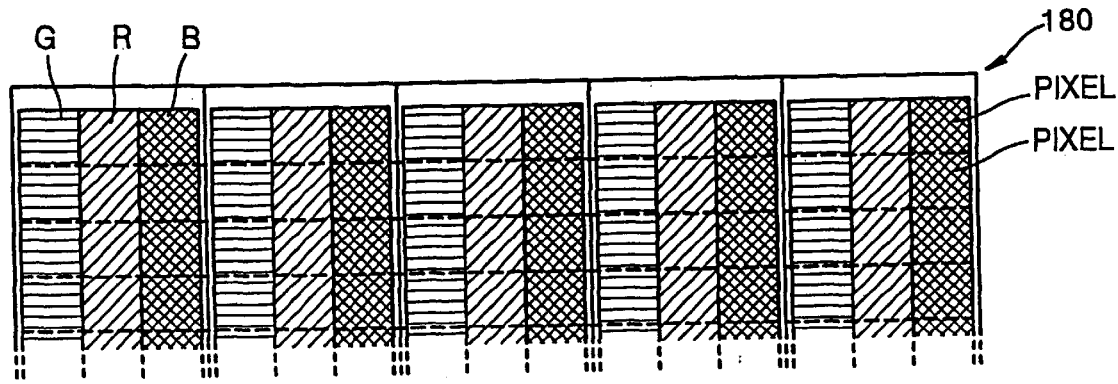

The sequentially generated images have proceeding paths which vary according to the driving state of the first and second light deflection devices 150 and 160. For example, when the first light deflection device 150 is in the OFF state and the second light deflection device 160 is in the ON state, so that the optical path "01" is selected, colors in units of pixels are arranged in an order of B, G and R as shown in FIG. 6A. While the first light deflection device 150 is in the ON state and the second light deflection device 160 is in the OFF state, so that the optical path "10" is selected, colors in units of pixels are arranged in an order of R, B and G as shown in FIG. 6B. When both of the first and second light deflection devices 150 and 160 are in the ON state, the optical path "11" is selected so that colors in units of pixels are arranged in an order of G, R and B as shown in FIG. 6C. Thus, R, G and B colors are sequentially formed with respect to each pixel area according to the driving state of the first and second light deflection devices 150 and 160, and thus a full colored image can be realized with respect to each pixel.

Figure 7:
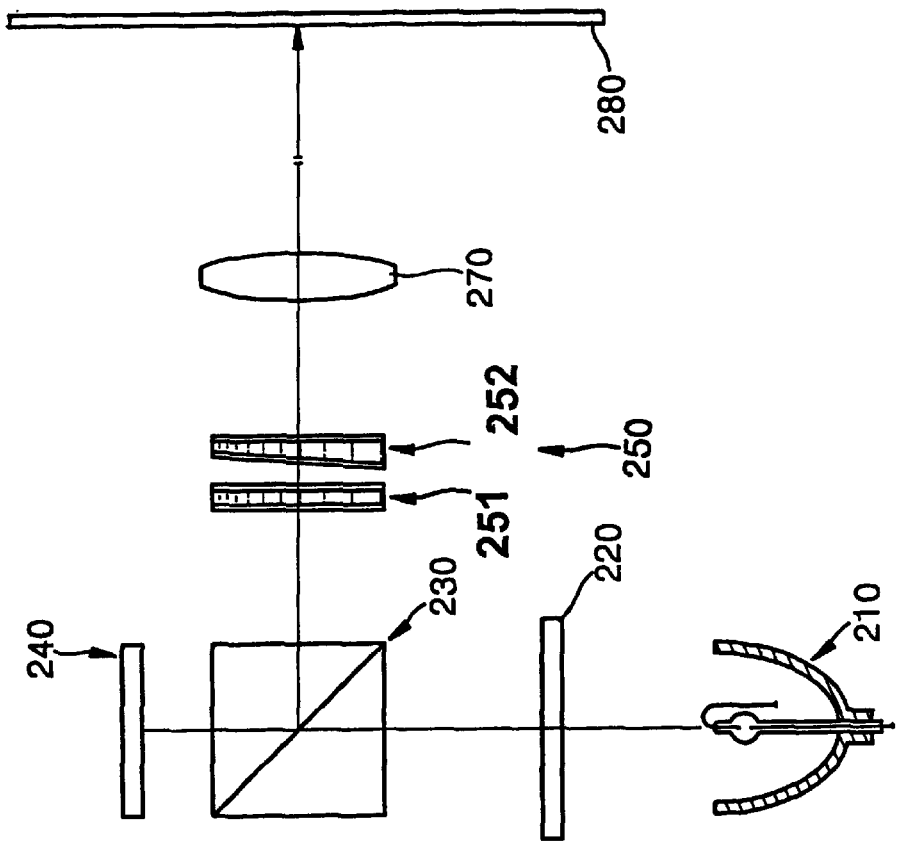
FIG. 7 is a view showing the optical arrangement of a projection type image display apparatus according to another embodiment of the present invention.

Referring to FIG. 7, a projection type image display apparatus according to a another embodiment of the present invention includes a light source 210, a polarization device 220, a polarization beam splitter 230, a reflection type image generating unit 240, a light deflection device 250, and a projection lens unit 270 magnifying and projecting an image deflected by the light deflection device 250 to proceed toward a screen 280. Here, since the light source 210, the polarization device 220, and the projection lens unit 270 are substantially the same as those in the previous embodiment, detailed descriptions thereof are omitted.

Figure 8:
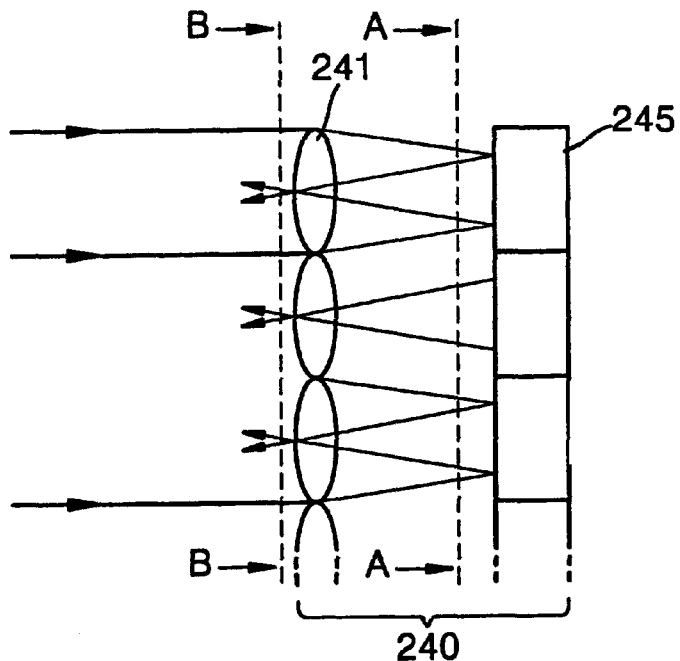
FIG. 8 is a view showing the optical arrangement of the image generating unit of FIG. 7.

The reflection type image generating unit 240 generates an image from incident light and reflects the generated image toward the polarization beam splitter 230. Referring to FIG. 8, the image generating unit 240 includes a reflection type display device 245 and a lens array 241 installed in front of the display device 245. The display device 245 comprises a plurality of pixels in a two-dimensional array which are independently driven. Each pixel of the display device 245 is independently driven to generate an image from incident light, which is split by the polarization beam splitter 230, and to reflect the generated image back toward the polarization beam splitter 230. The lens array 241 reconfigures the size of a pixel generated by the display device 245 and focuses the light emitted from the light source (210 of FIG. 7) and directed toward the display device 245 to be focused at each pixel, and simultaneously focuses divergent light reflected by the display device 245.

Figure 9:
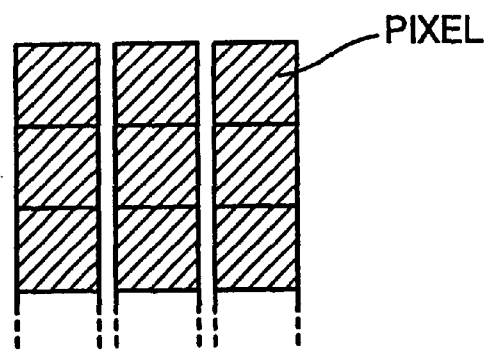
FIG. 9 is a view showing an image viewed from line A—A of FIG. 8.
Figure 10:
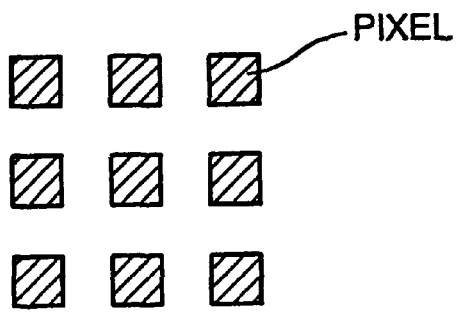
FIG. 10 is a view showing an image viewed from line B—B of FIG. 8.

FIGS. 9 and 10 show the images of sections taken along lines A—A and B—B of FIG. 8. Referring to FIGS. 9 and 10, the size of each of the pixels of the display device can be reduced to a great extent by the lens array 241. Accordingly, the image focused by the lens array 241 is focused on the screen 280, and simultaneously, the position at which the image is focused with respect to the pixel area is changed by the light deflection device 250 so that an image having a high resolving power can be realized.

The polarization beam splitter 230 is provided on an optical path between the polarization device 220 and the image generating unit 240 to change a proceeding path of the incident light according to the direction of polarization. That is, only the light corresponding to the image of the light polarized by the image generating unit 240 proceeds toward the light deflection device 250.

The light deflection device 250 deflects the incident image reflected by the image generating unit 240 and passing through the polarization beam splitter 230. The light deflection device 250 includes a first light deflection device 251 primarily deflecting and transmitting the incident light and a second light deflection device 252 secondarily deflecting the light deflected by the first light deflection device. Since the structures of the first and second light deflection devices of the light deflection device 250 are substantially the same as those of the first and second light deflection devices 150 and 160 according to the previous embodiment described with reference to FIG. 4, detailed description thereof will be omitted.

Figure 11A:
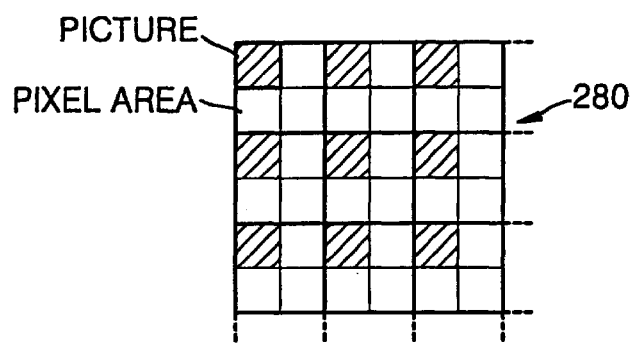
FIGS. 11A through 11D are views respectively showing displaced positions of an image formed on the screen according to driving of the light deflection device of the projection type image display apparatus according to the embodiment illustrated in FIG. 7.
Figure 11B:
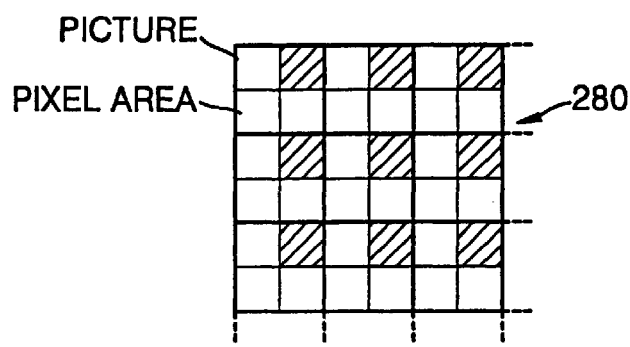
Figure 11C:
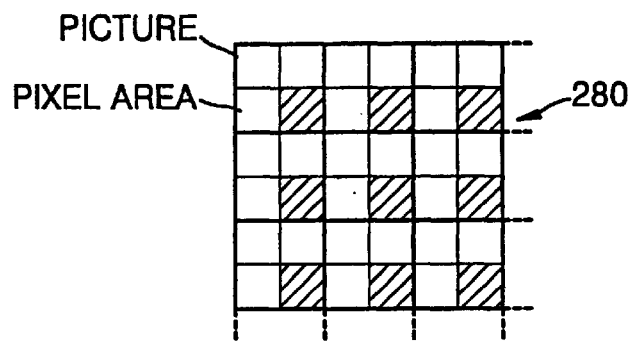
Figure 11D:
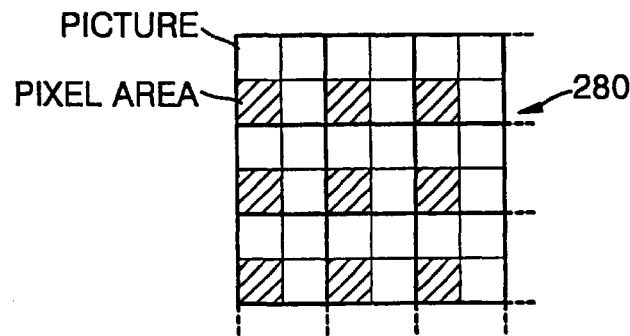

The first and second light deflection devices, constituting the light deflection device 250 according to the present embodiment, are different from those of the previous embodiment in their optical arrangement (although their structures are substantially the same, as stated above). That is, the first and second light deflection devices according to the present embodiment are optically arranged such that the directions of light deflected by the deflection devices can be perpendicular to each other. Thus, according to the driving state of the first and second light deflection devices, the image formed on the screen 280 can be sequentially positioned in an area of one pixel as shown in FIGS. 11A through 11D. For example, FIG. 11A shows the position of the image when both of the first and second light deflection devices are in the OFF state; FIG. 11B shows the position of the image when the second light deflection device only is in the ON state; FIG. 11C shows the position of the image when the first light deflection device only is in the ON state; and FIG. 11D shows the position of the image when both of the first and second light deflection devices are in the ON state. Thus, the image corresponding to each pixel is minimized by the lens array 241 and the minimized image is deflected so as to be sequentially focused at the entire area of an image, improving resolution.

Figure 12:
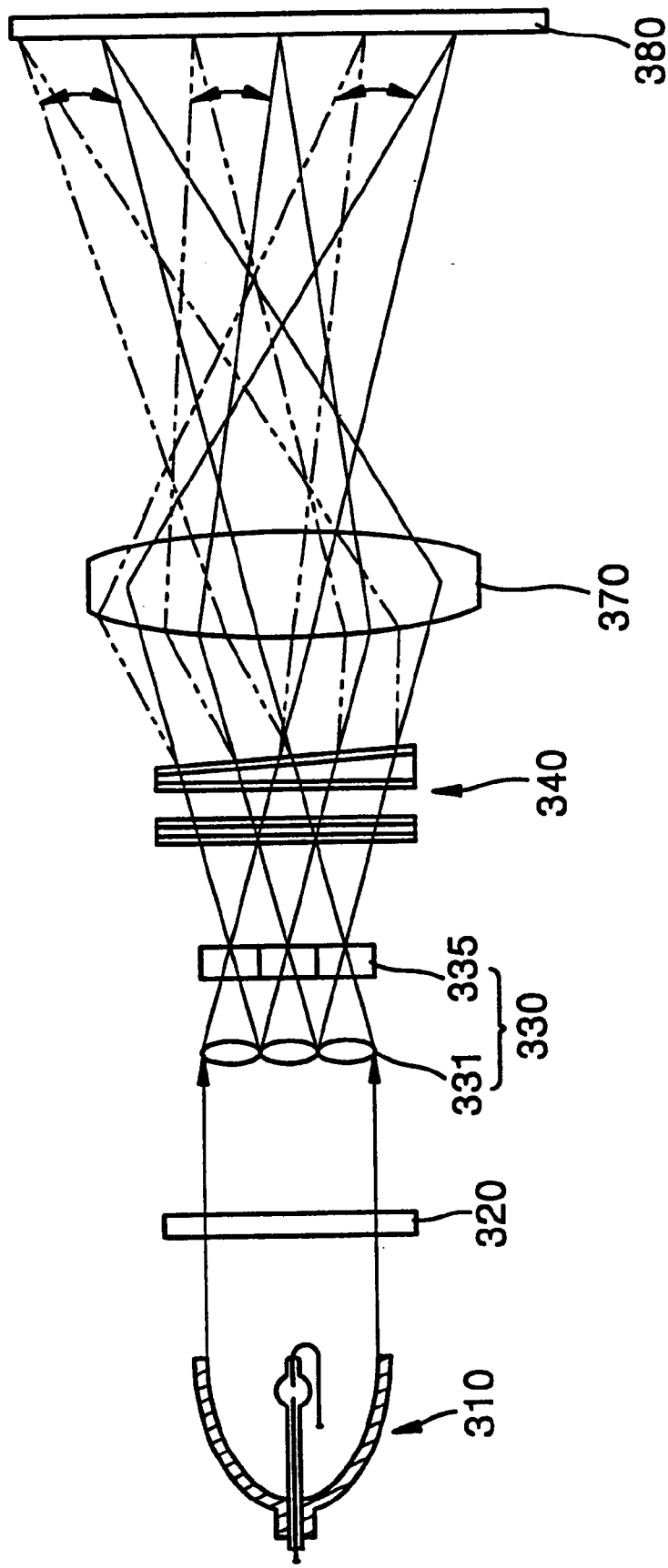
FIG. 12 is a view showing the optical arrangement of a projection type image display apparatus according to another embodiment of the present invention.

Referring to FIG. 12, a projection type image display apparatus according to another embodiment of the present invention includes a light source 310, a polarization device 320, a transmission type image generating unit 330, a light deflection device 340, and a projection lens unit 370 magnifying and transmitting an image deflected by the light deflection device 340 to proceed toward the screen 380. The projection type image display apparatus according to the present embodiment is characteristic in that the image generating unit 330 is of a transmission type, compared with the previous embodiment. Since the other optical members have substantially the same structures and functions as those described in the previous embodiment, detailed descriptions thereof will be omitted.

Figure 13:
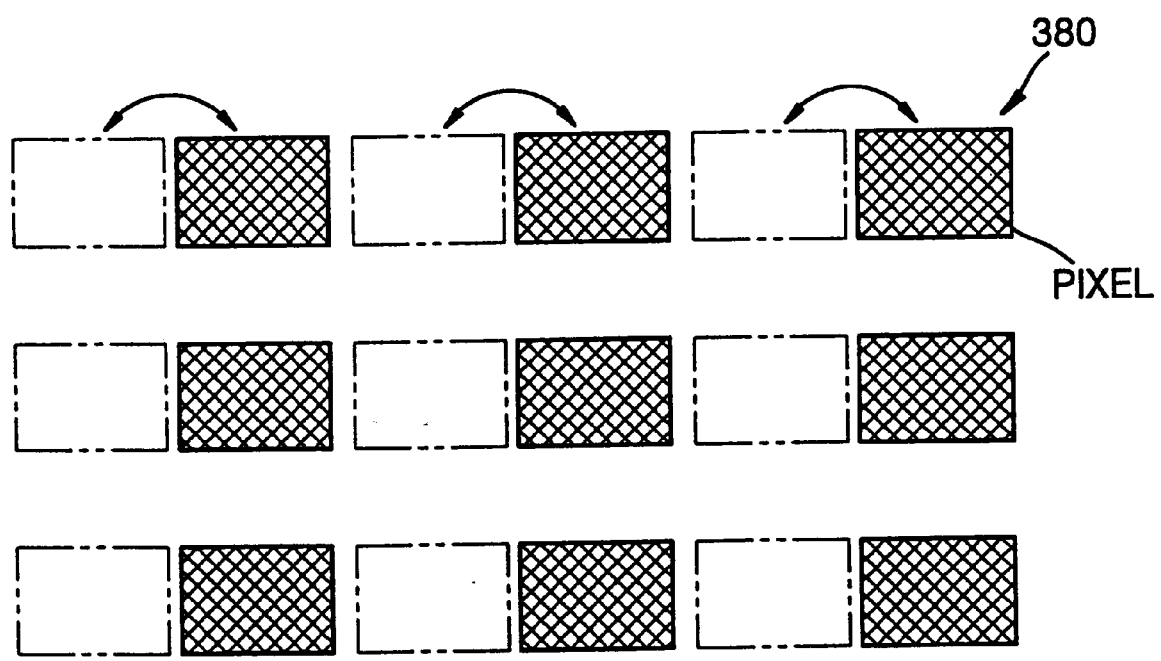
FIG. 13 is a view showing the displaced position of an image formed on the screen according to driving of the light deflection device of the projection type image display apparatus according to the embodiment illustrated in FIG. 12.

The image generating unit 330 generates an image from incident light and transmits the generated image. The generating unit 330 includes a transmission type display device 335 and a lens array 331 provided on an optical path between the transmission type display device 335 and the polarization device 320. The transmission type display device 335, having independently driven pixels, generates an image from the incident light and transmits it toward the light deflection device 340. The lens array 331 focuses the light emitted from the light source 310 and directed toward the display device 330 to be focused at each pixel of the display device 330. As the light is focused by the lens array 331, a small-sized image can be obtained. The image is deflected as the light deflection device 340 is driven so that the image can be placed at different positions, as shown in FIG. 13.

Figure 14:
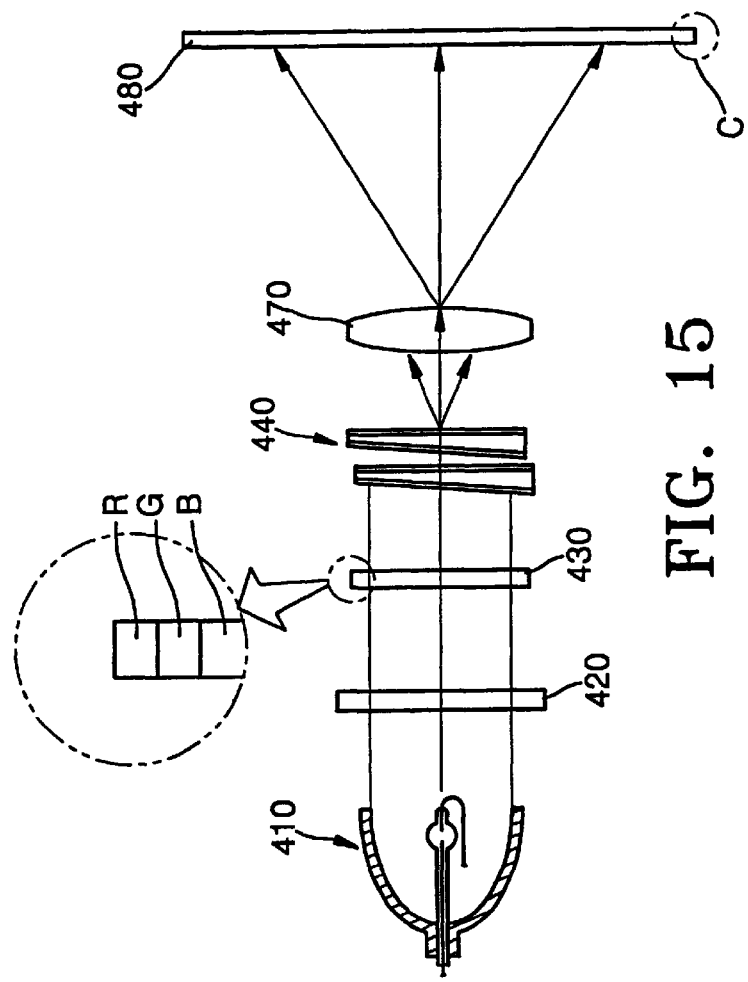
FIG. 14 is a view showing the optical arrangement of a projection type image display apparatus according to another embodiment of the present invention.

Referring to FIG. 14, a projection type image display apparatus according to another embodiment of the present invention includes a light source 410, a polarization device 420, a transmission type image generating unit 430, a light deflection device 440, and a projection lens unit 470 magnifying and transmitting an image deflected by the light deflection device 440 to proceed toward a screen 480. The projection type image display apparatus according to the present embodiment is characterized in that a color panel is used as the image generating unit 430 and the optical arrangement of the light deflection device 440, compared with the previous embodiment. Since the other optical members have substantially the same structures and functions as those described in the previous embodiment, detailed descriptions thereof will be omitted.

The image generating unit 430 is a transmission type display device having a color filter having independently driven pixels, generates a color image from incident light and transmits the generated color image toward the light deflection device 440. The color filter can selectively transmit R, G and B colors by sectioning the area of a liquid crystal display device. Since the display device capable of realizing a color image with a single panel is widely known, a detailed description thereof will be omitted.

Figure 15:
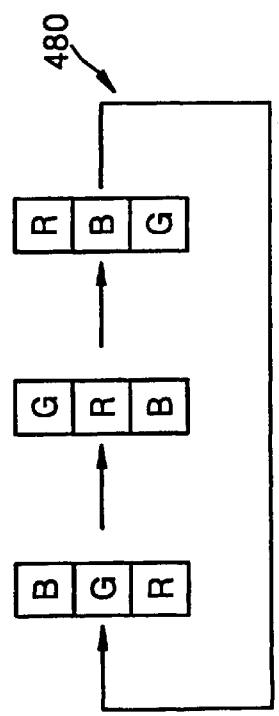
FIG. 15 is a view showing the displaced position of an image formed on the screen according to driving of the light deflection device of the projection type image display apparatus according to the embodiment illustrated in FIG. 14.

The light deflection device 440 has the same optical arrangement as that of the light deflection device (140 of FIG. 2) according to the embodiment of FIG. 2. Images are focused at the area of a pixel of the screen 480 in an order of (B, G, R), (G, R, B) and (R, B, G) according to the driving state, as shown in FIG. 15.

Figure 16:
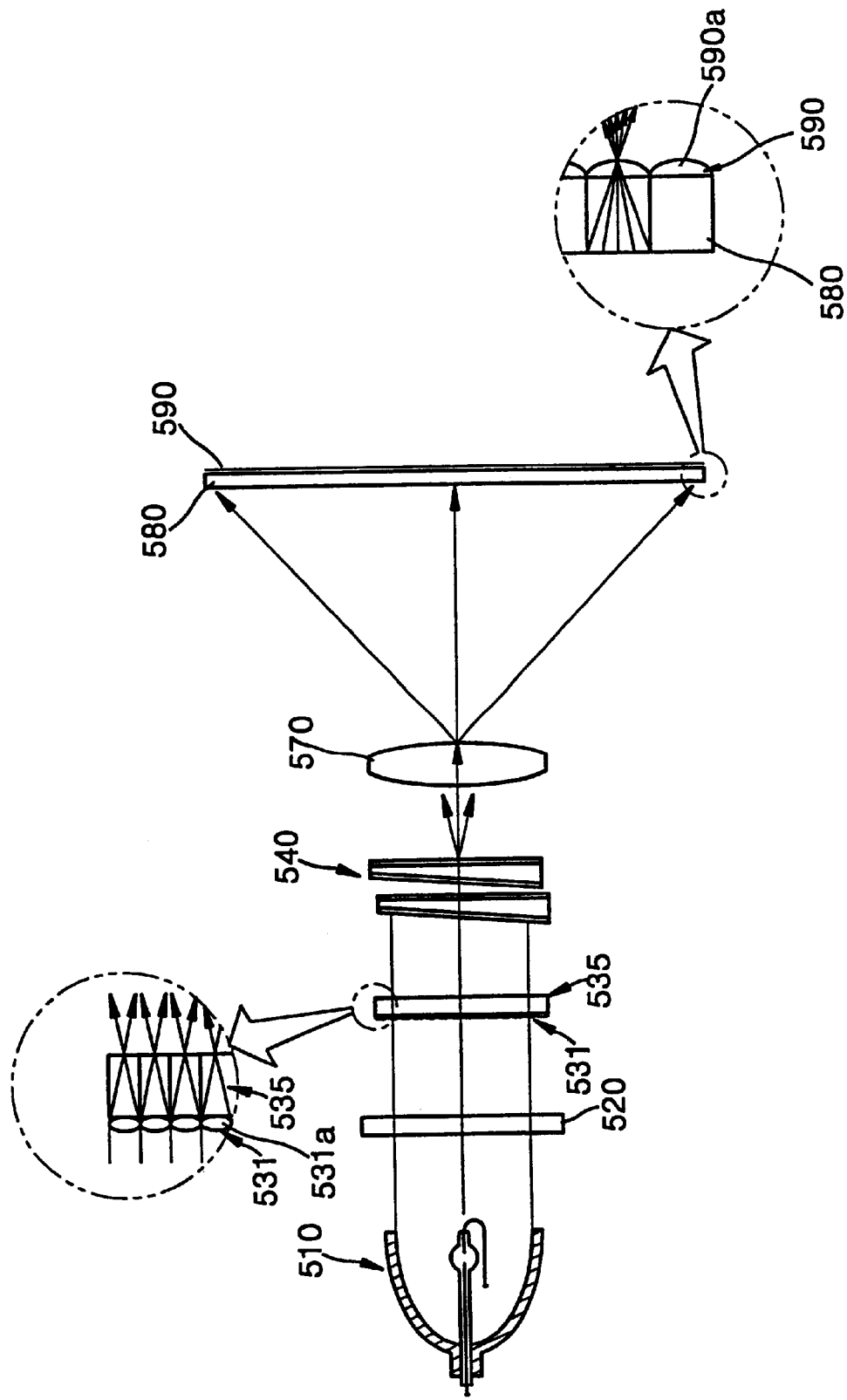
FIG. 16 is a view showing the optical arrangement of a projection type image display apparatus according to another embodiment of the present invention.

Referring to FIG. 16, a projection type image display apparatus according to another embodiment of the present invention includes a light source 510, a polarization device 520, a transmission type display device 535, a first lens array 531 provided at one side of the transmission type display device 535, a light deflection device 540, a projection lens unit 570 magnifying and transmitting an image deflected by the light deflection device 540 and directed toward a screen 580, and a second lens array 590 formed on at least one side of the screen 580. The projection type image display apparatus according to the present embodiment is characterized in that the first and second lens arrays 531 and 590 at one side of the display device 535 and on at least one side of the screen 580, respectively, form a three-dimensional image that can be realized by changing a driving method of the display device 535, compared with the previous embodiment. Here, since the other optical members have substantially the same structures and functions as those described in the previous embodiment, detailed descriptions thereof will be omitted.

Each of the first and second lens arrays 531 and 590 is preferably a cylindrical lens array having a plurality of cylindrical lenses 531a (590a) arranged adjacent to one another, each having a size corresponding to the width of each pixel forming the display device 535.

Here, the cylindrical lenses 531a and 590a forming the first and second lens arrays 531 and 590 correspond one to one. The image focused by one cylindrical lens 531a of the first lens array 531 is focused by one cylindrical lens 590a of the second lens array 590 corresponding thereto.

The light deflection device 540 sequentially moves the position of an image focused by the first lens array 531 so that the proceeding direction of the light passing through the second lens array 590 can be sequentially changed. The display device 535 varies so that the image generated through the respective pixels can correspond to the deflection position of the light deflection device 540. Accordingly, the image focused on the screen 580 may be different images which are variably generated by the display device 535. Thus, in the image generated by the display device 535, video signals photographing the same object at different angles are provided to the left and right eyes of a viewer within a range of time the viewer can perceive the displayed images as the same image, so that a three-dimensional image can be realized.

Figure 17:
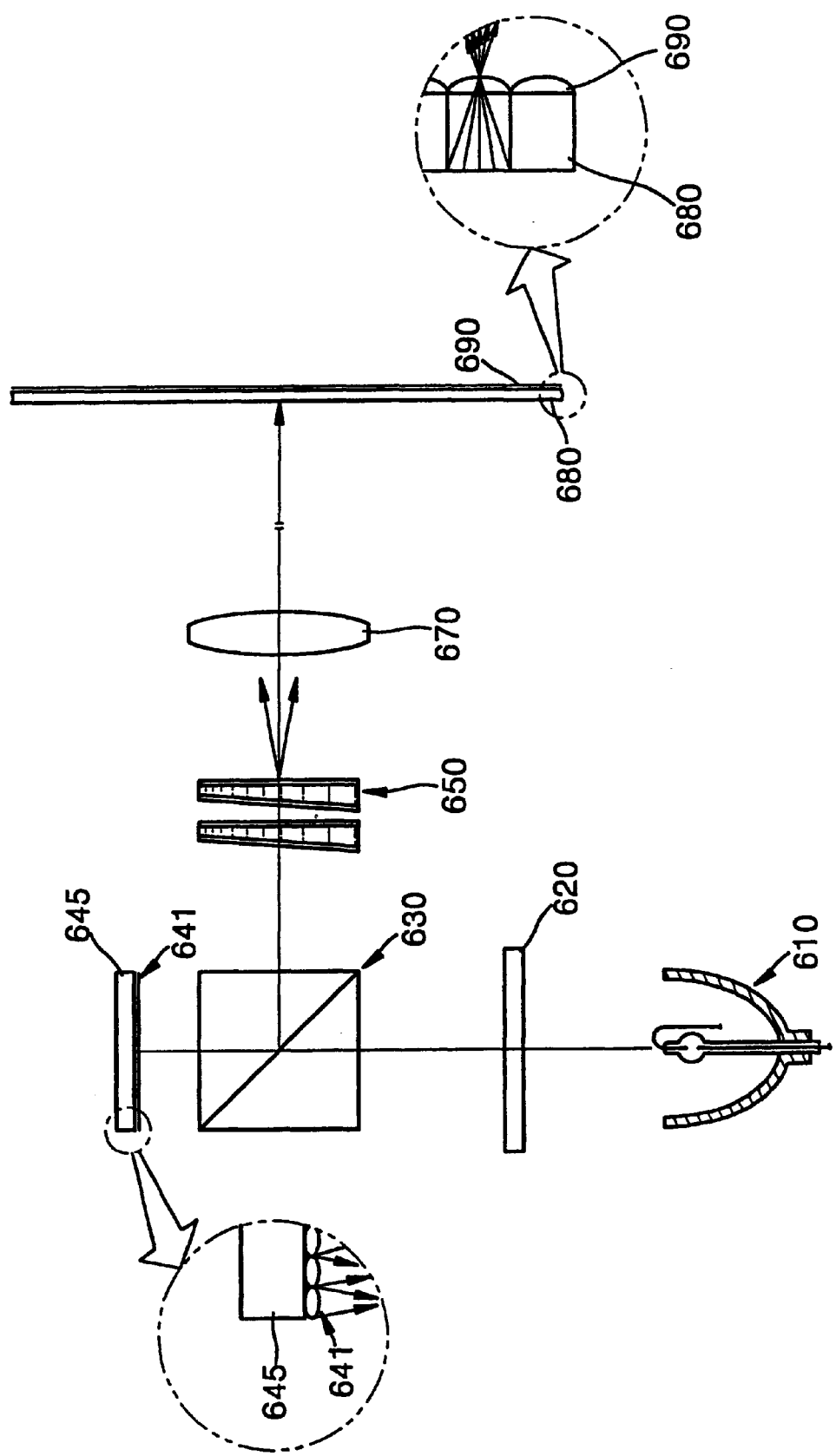
FIG. 17 is a view showing the optical arrangement of a projection type image display apparatus according to another embodiment of the present invention.

Referring to FIG. 17, a projection type image display apparatus according to another embodiment of the present invention includes a light source 610, a polarization device 620, a reflection type display device 645, a first lens array 641 provided at one side of the reflection type display device 645, a beam splitter 630, a light deflection device 650, a projection lens unit 670 magnifying and transmitting an image deflected by the light deflection device 650 and directed toward a screen 680, and a second lens array 690 formed on at least one side of the screen 680. The projection type image display apparatus according to the present embodiment is characterized in that the display device 645 is of a reflection type and the beam splitter 630 changing an optical path is provided on the optical path between the light source 610 and the display device 645, compared with the previous embodiment. Here, since the other optical members have substantially the same structures and functions as those described in the previous embodiment, detailed descriptions thereof will be omitted.

When the reflection type display device 645 is adopted, by providing images according to the position of the viewer as in the case of adopting the transmission type display device 535 of FIG. 16, a three-dimensional image can be realized.

As described above, in the projection type image display apparatus according to the present invention, light emitted from the light source is rearranged according to each of plural colors by using the light deflection device so that the color divided according to alternately arranged wavelength areas can be focused on the screen. Thus, a full color can be realized with respect to the area of a pixel, and an efficiency in use of light and resolving power can be improved.

Also, the size of the image generated by one pixel is minimized by using the lens array so that the image can occupy the minimum space with respect to the area of a pixel of the screen. Then, by changing the position of the image by using the light deflection device, resolution and resolving power ca be improved.

Further, since the first and second lens arrays are provided at each of the display device and the screen, and since the image generated by the display device is changed according to the deflection by the light deflection device, different images can be viewed according to the position of a viewer and simultaneously a three-dimensional image can be realized by differentiating an image for the left eye and an image for the right eye of the viewer.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A projection type image display apparatus comprising:
    a light source emitting light;
    a polarization device transmitting therethrough the light emitted from the light source polarized in one direction;
    a reflection type image generating unit generating color images from the polarized light and reflecting the generated color images to proceed along a path different from a path of the incident light;
    a light deflection device deflecting the color images reflected by the image generating unit; and
    a projection lens unit magnifying and transmitting the color images reflected by the image generating unit and deflected by the light deflection device to proceed toward a screen.

2. The apparatus as claimed in claim 1, wherein the image generating unit comprises:
    a color separation unit separating the polarized light according to a predetermined wavelength area so that the separated light proceeds at different angles; and
    a reflection type display device having independently driven pixels generating and reflecting an image from light of each of a plurality of colors separated by the color separation unit.

3. The apparatus as claimed in claim 2, wherein the color separation unit comprises:
    a hologram pattern diffracting and transmitting the polarized light according to each of a plurality of colors at different angles; and
    a lens array focusing the light of each color passing through the hologram pattern at each of the pixels of the display device.

4. The apparatus as claimed in claim 1, wherein the light deflection device comprises:
    a first light deflection device deflecting and transmitting the color images reflected by the image generating unit; and
    a second light deflection device arranged adjacent to the first light deflection device, deflecting and transmitting the light passing through the first deflection device so that images of a plurality of colors formed by the image generating unit are sequentially formed in the area of a pixel of the screen.

5. The apparatus as claimed in claim 4, wherein each of the first and second light deflection devices comprises:
    a pair of transparent electrode plates arranged to be separated a predetermined distance from each other and transmitting incident light;
    a power source selectively applying a voltage to the transparent electrode plates; and
    liquid crystal provided between the transparent electrode plates and changing a proceeding path of the incident image generated according to the voltage to the transparent electrode plates, wherein a deflection direction of the incident images are selected according to a direction that the liquid crystal is oriented.

6. A projection type image display apparatus comprising:
    a light source emitting light;
    a polarization device transmitting light emitted from the light source polarized in one direction;
    a reflection type image generating unit generating an image from the polarized light and reflecting the generated image;
    a polarization beam splitter, provided on an optical path between the polarization device and the image generating unit, reflecting or transmitting incident light according to the polarization direction;
    a light deflection device deflecting the image reflected by the image generating unit and passing through the polarization beam splitter; and
    a projection lens unit magnifying and transmitting the image deflected by the light deflection device to proceed toward a screen.

7. The apparatus as claimed in claim 6, wherein the image generating unit comprises:
    a reflection type display device having independently driven pixels generating the image from the polarized light and reflecting the generated image to proceed toward the polarization beam splitter; and
    a lens array provided on the optical path between the polarization beam splitter and the display device, focusing the polarized light toward the display device in units of pixel rays to be incident at each pixel of the display device.

8. The apparatus as claimed in claim 6, wherein the light deflection device comprises:
    a first light deflection device deflecting and transmitting the image reflected by the image generating unit; and
    a second light deflection device, arranged adjacent to the first light deflection device, deflecting and transmitting the light passing through the first light deflection device.

9. The apparatus as claimed in claim 8, wherein the first light deflection device is arranged to deflect and transmit light of the image generated in one direction, the second light deflection device is arranged to deflect and transmit light of the image generated in a direction perpendicular to the polarization direction of the first light deflection device, and an image to be incident at one position in the area of each pixel of the screen is sequentially incident at other positions within the pixel area.

10. The apparatus as claimed in claim 8, wherein each of the first and second light deflection devices comprises:
    a pair of transparent electrode plates arranged to be separated a predetermined distance from each other and transmitting the image generated;
    a power source selectively applying a voltage to the transparent electrode plates; and
    liquid crystal provided between the transparent electrode plates and changing a proceeding path of the image generated by the image generating unit according to the voltage to the transparent electrode plates, wherein a deflection direction of incident image can be selected according to the direction that the liquid crystal is oriented.

11. A projection type image display apparatus comprising:
    a light source emitting light;
    a polarization device transmitting the light emitted from the light source polarized in one direction;
    a transmission type image generating unit generating an image from the polarized light and transmitting the generated image;

a light deflection device deflecting the image passing through the image generating unit; and a projection lens unit magnifying and transmitting the image deflected by the light deflection device to proceed toward a screen.

12. The apparatus as claimed in claim 11, wherein the image generating unit comprises:

a transmission type display device having independently driven pixels generating an image from the polarized light and transmitting the generated image to proceed toward the light deflection device; and a lens array provided on the optical path between the polarization device and the display device focusing the polarized light to proceed toward the display device in units of pixel rays to be focused at each pixel of the display device.

13. The apparatus as claimed in claim 12, wherein the light deflection device comprises:

a first light deflection device deflecting and transmitting the image generated by the image generating unit; and a second light deflection device, arranged adjacent to the first light deflection device, deflecting and transmitting the light passing through the first light deflection device.

14. The apparatus as claimed in claim 13, wherein the first light deflection device is arranged to deflect and transmit incident light from the image generated by the image generating unit in one direction, the second light deflection device is arranged to deflect and transmit incident light from the image generated by the image generating unit in a direction perpendicular to the polarization direction of the first light deflection device is sequentially formed at other positions within the pixel area.

15. The apparatus as claimed in either claim 13, wherein each of the first and second light deflection devices comprises:

a pair of transparent electrode plates arranged to be separated a predetermined distance from each other for transmitting the incident image generated by the image generating unit;

a power source selectively applying a voltage to the transparent electrode plates; and liquid crystal provided between the transparent electrode plates changing a proceeding path of the incident image generated by the image generating unit according to the application of a voltage to the transparent electrode plates, wherein the deflection direction of incident image is selected according to the direction that the liquid crystal is oriented.

16. The apparatus as claimed in claim 11, wherein the image generating unit comprises a transmission type display device having independently driven pixels and a color filter generating a color image from the polarized light and transmitting the generated color image to proceed toward the light deflection device.

17. The apparatus as claimed in claim 16, wherein the light deflection device comprises:

a first light deflection device deflecting and transmitting the image generated by the image generating unit; and a second light deflection device, arranged adjacent to the first light deflection device, deflecting and transmitting the light passing through the first light deflection device in the same direction as the deflection direction of the first light deflection device, so that images of respective colors formed by the image generating unit are sequentially formed at the area of a pixel of the screen.

18. The apparatus as claimed in either claim 17, wherein each of the first and second light deflection devices comprises:

a pair of transparent electrode plates arranged to be separated a predetermined distance from each other for transmitting the incident image generated by the image generating unit;

a power source selectively applying a voltage to the transparent electrode plates; and liquid crystal provided between the transparent electrode plates changing a proceeding path of the image generated by the image generating unit according to the application of a voltage to the transparent electrode plates, wherein the deflection direction of incident image can be selected according to the direction that the liquid crystal is oriented.

19. A projection type image display apparatus comprising:

a light source emitting light;

a polarization device transmitting the light emitted from the light source polarized in one direction;

a display device having independently driven pixels generating images from the polarized light;

a first lens array formed of a plurality of lenses attached to one side of the display device focusing the image generated by the display device;

a light deflection device deflecting the image generated by the display device focused by the first lens array;

a projection lens unit magnifying and transmitting the image deflected by the light deflection device to proceed toward a screen; and a second lens array formed of a plurality of lenses corresponding to the number of lenses of the first lens array which is attached to at least one side of the screen.

20. The apparatus as claimed in claim 19, wherein each of the first and second lens arrays is a cylindrical lens array formed of a plurality of cylindrical lenses arranged adjacent to one another, each having a size corresponding to the width of each of the pixels forming the display device.

21. The apparatus as claimed in claim 19, wherein the display device is a transmission type display device generating images from the light emitted from the light source and transmitting the generated image.

22. The apparatus as claimed in claim 19, wherein the display device is a reflection type display device generating images from the polarized light and reflecting the generated images, and the apparatus further comprising a beam splitter provided on the optical path between the polarization device and the display device, changing a proceeding path of the polarized light to proceed toward the display device and a proceeding path of the polarized light reflected by the display device to proceed toward the light deflection device.

23. The apparatus as claimed in claim 19, wherein the light deflection device sequentially moves the position of the image focused by the first lens array so that a proceeding direction of the light passing through the second lens array can be sequentially changed, and the images generated by the display device vary according to the deflection position of the light deflection device so that different images can be viewed according to the position of a viewer.

24. The apparatus as claimed in claim 19, wherein the light deflection device comprises:

a first light deflection device deflecting and transmitting the images generated by the display device; and a second light deflection device arranged adjacent to the first light deflection device deflecting and transmitting the light passing through the first light deflection device in the same direction as the deflection direction by the first light deflection device, wherein images of respective colors formed by the display device are sequentially formed in the area of a pixel of the screen.

25. The apparatus as claimed in claim 24, wherein each of the first and second light deflection devices comprises:
a pair of transparent electrode plates arranged to be separated a predetermined distance from each other and transmitting the image generated by the display device;
a power source selectively applying a voltage to the transparent electrode plates; and
a liquid crystal provided between the transparent electrode plates changing a proceeding path of the image generated by the display device according to the application of a voltage to the transparent electrode plates, wherein the deflection direction of image can be selected according to the direction that the liquid crystal of the first and second light deflection devices is oriented.

26. A method of forming an image comprising:
emitting light rays polarized in one direction;
generating a color image from said polarized light rays and reflecting said color image;
deflecting said reflected color image; and
magnifying and transmitting said deflected color image onto a screen.

27. The method according to claim 26, wherein the generating the color image further comprises:
separating the polarized light rays according to each of a plurality of colors, directing said separated rays at different angles, and generating and reflecting an image from light of the plurality of colors separated.

28. The method of claim 27, wherein the separating the polarized light rays further comprises:
diffracting and transmitting the polarized light according to each of the plurality of colors at different angles and focusing the light of each color into individual pixels on a display unit.

29. The method according to claim 28, wherein the deflecting said color image further comprises:
deflecting and transmitting the reflected color image a first time and a second time subsequently such that images of respective colors are sequentially formed in an area of a pixel on the display unit.

30. The method according to claim 29, further comprising changing a direction of deflection of the color image electrically.

31. A method of forming an image comprising:
emitting light rays polarized in one direction;
generating an image from said polarized light rays;
dividing and transmitting said polarized light rays forming the image according to their polarized direction;
deflecting at least one portion of said image; and
magnifying and transmitting said deflected image onto a display unit.

32. The method according to claim 31, wherein the generating an image further comprises:
focusing the polarized light rays into units of pixels each forming the image and reflecting each image.

33. The method according to claim 31, wherein the deflecting said image further comprises:
deflecting and transmitting the reflected image a first time and a second time subsequently such that images of respective colors are sequentially formed in an area of a pixel on the display unit.

34. A method of forming an image comprising:
emitting light rays polarized in one direction;
generating an image from said polarized light rays and transmitting said image in substantially the same direction as said polarized light rays;
deflecting said generated image; and
magnifying and transmitting said deflected image toward a display unit.

35. The method according to claim 34, wherein the generating an image further comprises:
focusing the polarized light rays in units of pixels each forming an image on the display unit.

36. The method according to claim 35, wherein deflecting said image further comprises:
deflecting and transmitting the generated image a first time and a second time subsequently.

37. The method according to claim 36, wherein the image deflected and transmitted the second time is in a direction perpendicular to the polarization direction of the image deflected and transmitted the first time, such that an image formed at one position in the area of a pixel can be sequentially formed at other positions within the pixel area on the display unit.

38. The method according to claim 34, wherein the generating an image further comprises dividing the polarized light rays into individual pixels on the display unit.

39. The method according to claim 38, wherein deflecting the image further comprises:
deflecting and transmitting the generated image a first time and then a second time in the same direction as the first time such that the image generated includes a plurality of colors sequentially formed in an area of a pixel on the display unit.

40. A projection type image display apparatus comprising:
a light source emitting light;
a polarization device transmitting light emitted from the light source polarized in one direction;
an image generating unit generating a color image from the polarized light;
a light deflection device deflecting the color image; and
a projection lens unit magnifying and transmitting the deflected color image onto a screen.

41. A method of forming an image comprising:
emitting light rays polarized in one direction;
generating a color image from said polarized light rays;
deflecting said generated color image; and
magnifying and transmitting said deflected color image onto a display unit.

* * * * *